Sept. 25, 1956  J. H. C. PAYETTE  2,764,120
VEHICLE SIGNAL DEVICE
Filed April 8, 1955

INVENTOR.
Joseph H. C. Payette
BY Alex. E. MacRae
Attorney.

United States Patent Office 2,764,120
Patented Sept. 25, 1956

2,764,120

VEHICLE SIGNAL DEVICE

Joseph H. C. Payette, Ottawa, Ontario, Canada, assignor of thirty per cent to Michael Dzuba, ten per cent to Marcel Robert, both of Ottawa, Ontario, Canada, fifteen per cent to Jean Yves Payette, and fifteen per cent to Paul Payette, both of Wrightville, Quebec, Canada Application April 8, 1955, Serial No. 500,255

1 Claim. (Cl. 116—41)

This invention relates to vehicle signal device.

During the transportation of elongated articles by vehicles such as motor trucks, it is frequently advisable to place a warning signal flag on portions of such articles which project beyond the rear end of the transporting vehicle. Such warning flags are required by law in various localities and are necessary as a safeguard against accidents. Generally speaking, however, the type, location and character of such flags is left to the selection of the operator of the vehicle. As a consequence, the flag employed is usually of nondescript character and haphazard selection, and its location on the vehicle is frequently not best calculated to perform its proper function. Frequently the flag simply takes the form of a small piece of red cloth tied to a projecting portion of an article at any convenient location.

It is an object of this invention to provide a vehicle signal flag device of convenient and inexpensive structure and which is capable of convenient and permanent attachment to a vehicle which in mounted position on a vehicle does not interfere with the normal functioning thereof, which carries signal means susceptible to easy and rapid movement for location in any desired position rearwardly of the vehicle, and which in any such selected position provides a signal of arresting character.

Figure 1:
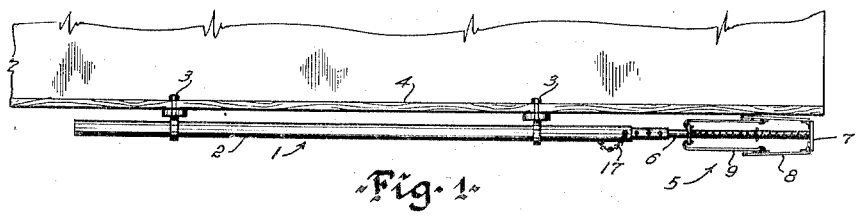
Figure 2:
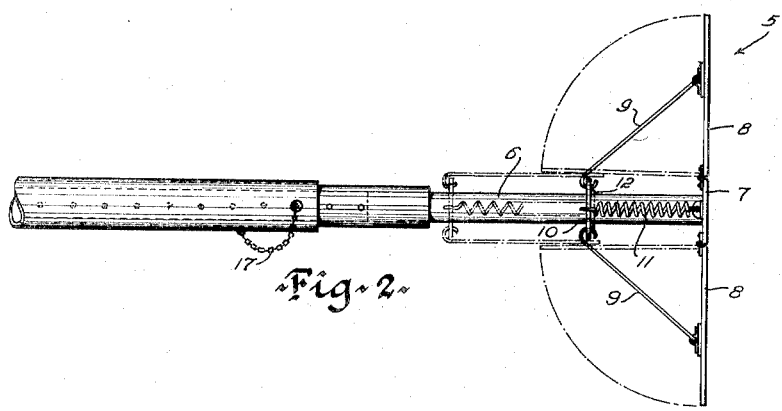
Figure 3:
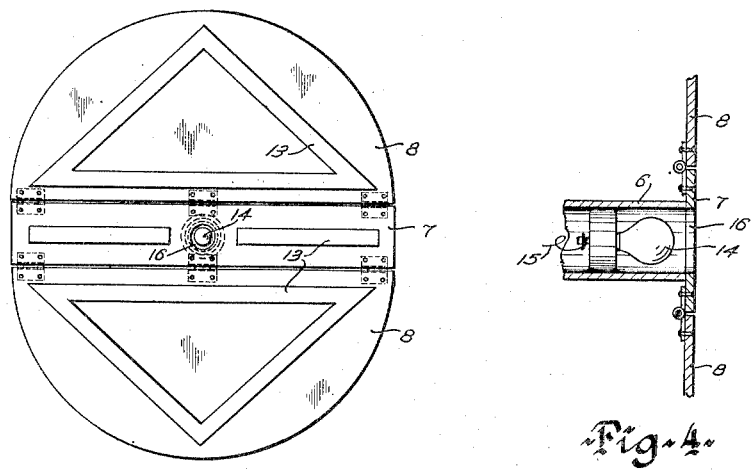
Figure 4:
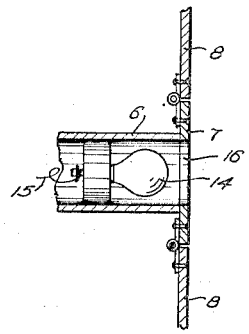

The invention will be described with reference to the accompanying drawing, in which Figure 1 is a side elevation of a signal device in accordance with the invention, Figure 2 is a side elevation of the signal device in operating position, Figure 3 is an end elevation, and Figure 4 is an enlarged partial sectional side elevation.

In the drawing, the device comprises a telescopic arm assembly 1, preferably of tubular metal structure. The main base section 2 of the telescopic arm may be secured as by U-bolts 3 to the vehicle such as a motor truck. As shown, the section 2 is mounted beneath of the floor 4 of a truck body. Signal means 5 is mounted on the extensible end section 6 of the telescopic arm. Such means 5 may comprise a bar 7 fixed to the end of section 6 and a pair of generally semi-circular plates 8 hingedly mounted on bar 7. The rear face of each plate 8 is connected by means of a pivotally mounted rod 9 to an annular bracket 10 slidably mounted on section 6. A spring 11 connected to bracket 10 urges the latter in a rearward direction. A stop pin 12 fixed to section 6 is engageable by bracket 10 to locate the plates 8 in radial or outwardly aligned position. It will be apparent that the plates 8 may be swung forwardly against the action of spring 11 into folded position upon section 6, as shown in Figure 1, in which position the plates 8 may fit compactly beneath the floor 4 of the truck. When, however, section 6 is extended rearwardly beyond the truck floor, the plates 8 may be swung into "open" or radially extending position, as previously indicated. Any suitable means, such as indicated at 17, may be provided for locking the telescopic arm in extended position.

The rear face of each plate 8, as well as, if desired, that of bar 7, is provided with any suitable signal element 13, such as fluorescent or like paint or tape. Further, if desired, a signal lamp 14 may be mounted in the rear end of section 6, the wiring 15 therefor being conveniently led through the hollow telescopic arm assembly the bar 7 is provided with an opening 16 through which the lamp is visible. Conventional means for producing intermittent flashing of the lamp 14 may be incorporated in the device.

It will be apparent that the device described is of inexpensive character and may be readily mounted on existing vehicles. In retracted position with the signal plates 8 in folded form, it fits snugly and compactly beneath the floor of the vehicle and constitutes no interference with the normal functioning thereof. When required to serve as a warning signal due to the transportation of articles projecting rearwardly of the vehicle, the telescopic arm is readily extended rearwardly to a point beyond the rearward limit of such articles and the signal plates 8 swung into open or signal display position. It will be apparent that the telescopic arm 1 of the device described may possess sufficient extensiblity to meet substantially all required conditions of use. Moreover, the signal means may be precisely located in the most suitable position for the purpose.

I claim:

In combination with the floor of a vehicle body, a vehicle body, a vehicle signal device comprising a tubular telescopic arm having a section attachable to the underside of said vehicle floor, a second section extensible from said first section, a bar fixed to the end of said second section and extending right angularly therefrom, a pair of plates each having signal elements thereon and each being hingedly connected to said bar and swingable to operative position in one direction into radially extending relation to said second section, and to non-operative position in the other direction into over-lapping relation with said second section, resilient means urging said plates into said radially extending relation comprising a bracket slidably carried by said second section, a link connecting said bracket with each said plate, and a spring connecting said bracket with said end of said second section, said plates being arranged to underlie said floor in said non-operative position for engagement of at least one of said plates with said floor to maintain said overlapping relation and to prevent sliding movement of said bracket on said second section under the action of said spring.

References Cited in the file of this patent

UNITED STATES PATENTS 1,445,407   Nelson _____ Feb. 13, 1923